United States Patent [19]

Shinohara et al.

[11] Patent Number: 5,195,421
[45] Date of Patent: Mar. 23, 1993

[54] VACUUM BOOSTER

[75] Inventors: Takayoshi Shinohara; Toshiyuki Suwa, both of Nagano, Japan

[73] Assignee: Nissin Kogyo Co., Ltd., Nagano, Japan

[21] Appl. No.: 783,963

[22] Filed: Oct. 29, 1991

[30] Foreign Application Priority Data

Jan. 17, 1991 [JP] Japan .............................. 3-000965[U]

[51] Int. Cl.⁵ .............................................. F01B 29/00
[52] U.S. Cl. .................................... 92/161; 60/547.1; 91/369.1; 91/369.2; 91/376 R
[58] Field of Search ......................... 92/161; 60/547.1; 91/369.1, 369.2, 376 R

[56] References Cited

U.S. PATENT DOCUMENTS

Re. 31,911 6/1985 Ohta et al. .
4,296,680 10/1981 Ohta et al. .

FOREIGN PATENT DOCUMENTS 55-76742 6/1980 Japan .
55-76743 6/1980 Japan .
1231365 5/1971 United Kingdom .

Primary Examiner—Edward K. Look
Assistant Examiner—Todd Mattingly
Attorney, Agent, or Firm—Armstrong, Westerman, Hattori, McLeland Naughton

[57] ABSTRACT

A pedestal formed bulged on a rear wall of a booster shell and attached to a vehicle body by four connecting bolts has a pheripheral wall whose length from a general wall of the rear wall of the booster shell to a seating face wall of the pedestal becomes larger toward each of corners of the pedestal. This ensures that the concentration of a stress produced at each of the corners of the peripheral wall of the pedestal can be moderated, thereby providing an improvedment in durability of the rear wall of the booster shell and suppressing an increase in internal volume of the pedestal to the utmost.

3 Claims, 2 Drawing Sheets

VACUUM BOOSTER

BACKGROUND OF THE INVENTION

1. Field of the Invention

The field of the present invention is vacuum boosters of a type for operating a master cylinder for a brake or a clutch in an automobile in a boosting manner by a vacuum pressure, and particularly, improvements of such vacuum boosters comprising a pedestal formed on a rear wall of a booster shell and comprised of a rectangular seating face wall surrounding an axis of the booster shell, and a peripheral wall inclined from the seating face wall, the pedestal being attached to a vehicle body through four connecting bolts fixedly mounted on the seat face wall in proximity to four corners thereof.

2. Description of the Related Art

In such a conventional vacuum booster, the peripheral wall of the pedestal is formed bulged on the rear wall of the booster shell, so that the length from a general wall of the rear wall to the seating face wall is uniform at various portions (see for example, Japanese Utility Model Application Laid-open No. 79058/82).

In the conventional vacuum booster of the type above-described, during the boosting operation, stress tends to be concentrated around each of the corners of a peripheral edge of the pedestal due to an axial tensile load acting on the booster shell.

SUMMARY OF THE INVENTION

Accordingly, it is an object of the present invention to moderate the concentration of the stress around each of the corners of the peripheral edge of the pedestal to provide an improvement in durability of the booster shell.

To achieve the above object, according to the present invention, there is provided a vacuum booster comprising a pedestal formed on a rear wall of a booster shell and comprised of a rectangular seating face wall surrounding an axis of the booster shell, and a peripheral wall inclined from the seating face wall, the pedestal being attached to a vehicle body through four connecting bolts fixedly mounted on the seating face wall in proximity to four corners thereof, wherein the peripheral wall of the pedestal is formed such that a length from a general wall of the rear wall of the booster shell to the seating face wall becomes larger toward each of the corners of the peripheral wall.

With the above feature of the present invention, the corners of the pedestal are connected to the general wall of the rear wall of the booster shell in a wide region, thereby moderating the concentration of a stress to contribute to an improvement in durability of the rear wall of the booster shell. Moreover, an increase in internal volume of the pedestal can be suppressed to the utmost, thereby preventing a reduction in response property of a booster piston.

The above and other objects, features and advantages of the invention will become apparent from a reading of the following description of the preferred embodiment, taken in conjunction with the accompanying drawings.

DESCRIPTION OF THE PREFERRED EMBODIMENT

The present invention will now be described by way of one embodiment in connection with the accompanying drawings.

Figure 1:
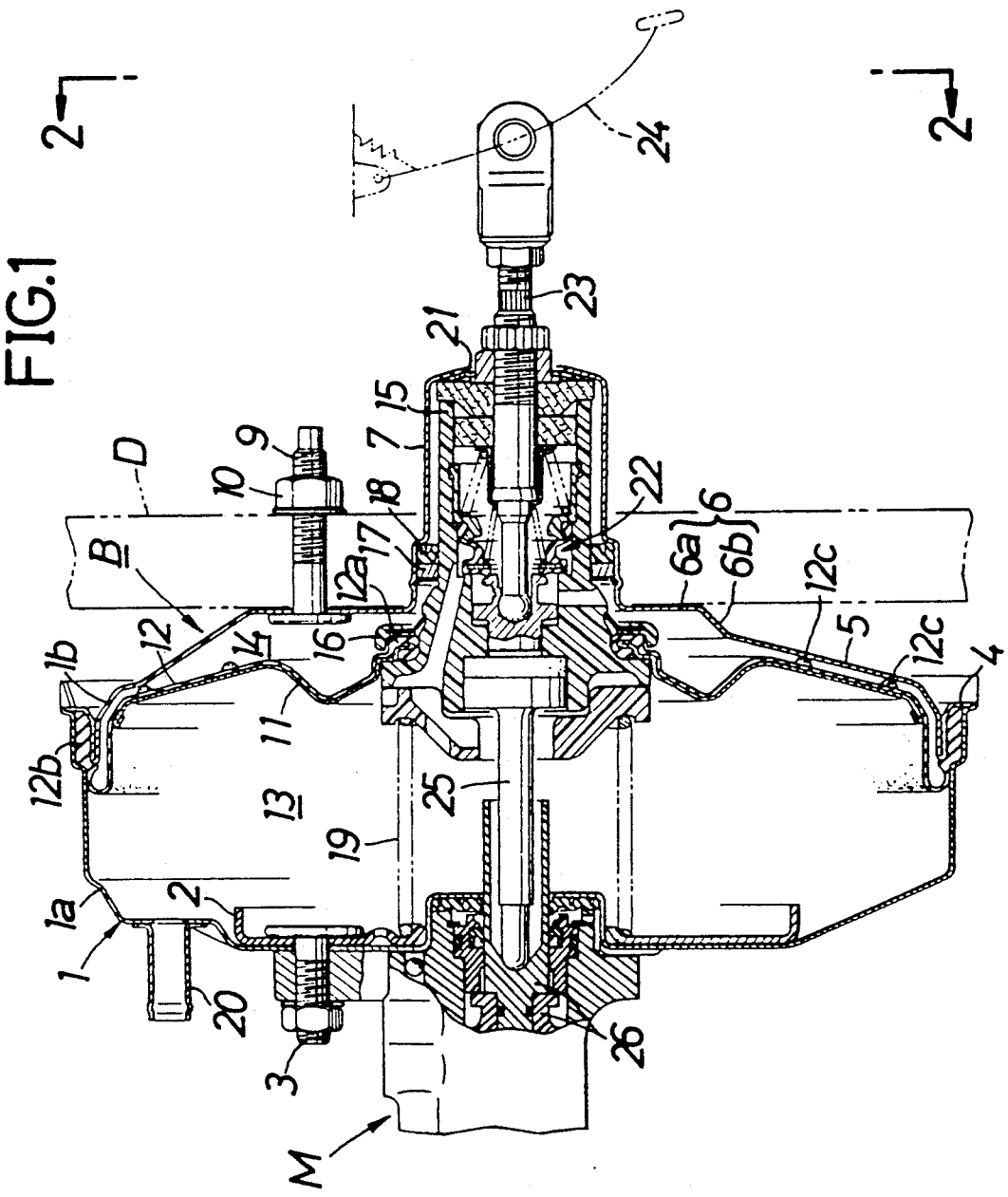
FIG. 1 is a longitudinal sectional view of a vacuum booster (sectional view taken along a line I—I in FIG. 2)

Referring to FIG. 1, a booster shell 1 of a vacuum booster B is comprised of front and rear shell halves 1a and 1b with their opposed ends coupled to each other. A reinforcing plate 2 is bonded to an end wall of the front shell half 1a. The front shell half 1a cooperates with the reinforcing plate 2 to support a brake master cylinder M through a pair of connecting bolts 3 (only one of which is shown in FIG. 1).

Figure 2:
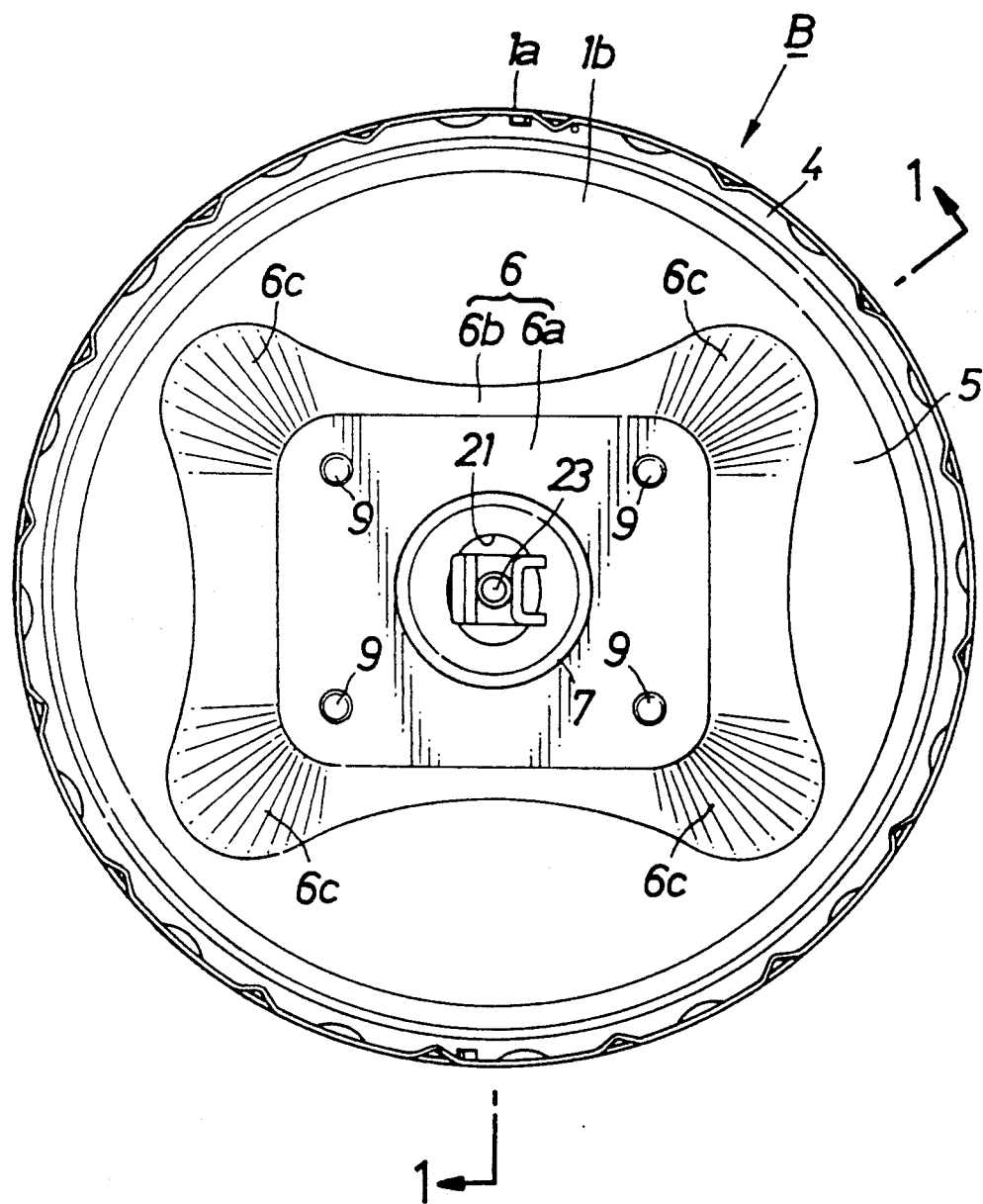
FIG. 2 is a view taken along an arrow 2—2 in FIG. 1.

As shown in FIGS. 1 and 2, the rear shell half 1b is comprised of a flange 4 coupled to the front shell half 1a, a dish-like wall 5 extended in a bent manner rearwardly and radially inwardly from an inner peripheral edge of the flange 4, a pedestal 6 bulged rearwardly from the dish-like wall 5, and a cylindrical extended portion 7 extended rearwardly from a seating face wall 6a of the pedestal 6 about an axis of the booster shell 1.

The seating face wall 6a of the pedestal 6 is rectangular with longer sides vertical and shorter sides lateral, and four connecting bolts 9 are fixedly mounted on the seating face wall 6a in proximity to four corners thereof to project rearwardly. The pedestal 6 is mounted to a dashboard D of a vehicle body by these connecting bolts 9 and nuts 10 threaded over the connecting bolts 9.

A peripheral wall 6b of the pedestal 6 is formed such that it is inclined from the seating face wall 6a toward the dish-like wall 5, and that a length from the dish-like wall 5 to the seating face wall 6a becomes larger toward each corner 6c of the peripheral wall 6b. Each of the corners 6c is formed rounded and a roundness of the corner becomes larger in radius toward the dish-like wall 5.

An interior of the booster shell 1 is divided into a front vacuum chamber 13 and a rear working chamber 14 by a booster piston 11 contained in the booster shell 1 for longitudinal reciprocal movement and by a diaphragm 12 superposed on a rear surface of the booster piston 11. The diaphragm 12 includes an outer peripheral bead 12b which is clamped between both the shell halves 1a and 1b, and an inner peripheral bead 12a which is secured, together with the booster piston 11, to a valve cylinder 15 extended through central portions of the inner peripheral bead 12a and the booster piston 11 by a retaining ring 16. The valve cylinder 15 is slidably carried in the cylindrical extended portion 7 through a bush 17 and a sealing member 18. Thus, the booster piston 11 is movable forwardly from its retreat limit together with the valve cylinder 15. The retreat limit is defined by abutment of the booster piston 11 against an inner surface of the dish-like wall 5 through the diaphragm 12. A return spring 19 is mounted in a compressed manner in the vacuum chamber 13 for biasing the booster piston 11 toward the retreat limit. A large number of projections 12c are formed on a rear surface of the diaphragm 12 for preventing the diaphragm 12 from sticking to the dish-like wall 5 at the retreat limit.

The vacuum chamber 13 is connected to a vacuum pressure source (not shown) (e.g., an interior of an intake manifold in an internal combustion engine) through a vacuum pressure inlet pipe 20.

Disposed in the valve cylinder 15 are a known control valve 22 for permitting the working chamber 14 to be alternately put into communication with the vacuum chamber 13 and an atmospheric air inlet port 21 at a rear end of the cylindrical extended portion 7 in a switched manner, and an input rod 23 for operating the control valve 22 in a switching manner. The input rod 23 is operated by means of a brake pedal 24.

An output rod 25 is connected to the booster piston 11 and also connected to a piston 26 of the master cylinder M.

The operation of this embodiment will be described below.

If the input rod 23 is advanced by depressing the brake pedal 24, the working chamber 14 is put out of communication with the vacuum chamber 13 and at the same time into communication with the atmospheric air inlet port 21 by the control valve 22, so that the atmospheric pressure is applied to the working chamber 14, thereby producing a difference in pressure between the vacuum chamber 13 and the working chamber 14. This difference in pressure causes the booster piston 11 to be advanced, thereby operating the piston 26 of the master cylinder M through the output rod 25 in a boosting manner. If the brake pedal 24 is released to retreat the input rod 23, the working chamber 14 is put out of communication with the atmospheric air inlet port 21 and at the same time into communication with the vacuum chamber 13 by the control valve 22, so that the difference in pressure between both the chambers 13 and 14 is reduced, permitting the booster piston 11 to be returned to the retreat limit under the action of a resilient force of the return spring 19, thereby releasing the operation of the master cylinder M.

During advancing operation of the booster piston 11, a longitudinal tensile load is applied to the booster shell 1 by a forward thrust force applied to the master cylinder M by the booster piston 11 and by a reaction force produced in the dashboard D. In such a case, stress is concentrated in the rear shell half 1b at a peripheral edge of the pedestal 6 secured to the dash board D by the four connecting bolts 9, particularly at locations, around the corners 6c near the connecting bolts 9 at a boundary between the pedestal 6 and the dish-like wall 5. According to the present invention, however, such a stress produced around each of the corners 6c is dispersed into the dish-like wall 5 in a wide range, because each corner 6c is connected to the dish-like wall 5 in a wide region because the length from the dish-like wall 5 to the seating face wall 6a becomes larger toward each corner 6c and the radius of the roundness of each corner 6c becomes larger toward the dish-like wall 5. In this manner, the concentration of the stress is moderated, leading to an improvement in durability of the rear shell half 1b.

An increase in length of the peripheral wall 6b of the pedestal 6 from the dish-like wall 5 to the seating face wall 6a results in an increase in internal volume of the pedestal 6, which increase in internal volume causes an increase in volume of the working chamber 14 at the retreat limit of the booster piston 11. This is not desirable because this brings about a reduced response capability of the booster piston 11 during advancing movement of the input rod 23. According to the present invention, however, such length of the peripheral wall 6b of the pedestal 6 is reduced toward a central portion of each side of the pedestal 6 and, therefore, it is possible to suppress the increase in internal volume of the pedestal 6 to the utmost, thereby avoiding a reduction in response capability of the booster piston 11.

Although the vacuum booster of the above embodiment has been of a single type, it will be understood that the present invention is applicable to a tandem type including a pair of front and rear booster pistons.

What is claimed is:

1. A vacuum booster comprising:
   a pedestal formed on a rear wall of a booster shell;
   a rectangular seating face wall surrounding an axis of the booster shell; and
   a peripheral wall inclined from the seating face wall,
   said pedestal being attached to a vehicle body through four connecting bolts fixedly mounted on the seating face wall in proximity to four corners thereof,
   wherein the peripheral wall of the pedestal is formed such that a length from a dish-like wall of the rear wall of the booster shell to the seating face wall becomes larger toward each of corners of the peripheral wall.

2. A vacuum booster according to claim 1, wherein each of said corners of the peripheral wall of said pedestal is formed rounded and a roundness of the corner becomes larger in radius toward said dish-like wall.

3. A vacuum booster according to claim 1 or 2, further comprising:
   a booster piston which is longitudinally movably contained in said booster shell to divide an interior of the booster shell into a front vacuum chamber and a rear working chamber;
   a valve cylinder connected to said booster piston and slidably carried on the rear wall of the booster shell;
   a control valve disposed in said valve cylinder for permitting said working chamber to be put alternately into communication with the atmosphere and said vacuum chamber in a switched manner;
   an input rod disposed in said valve cylinder for operating said control valve; and
   a master cylinder attached to a front wall of said booster shell so as to be advanced by said input rod and said booster piston through an output rod.

* * * * *